United States Patent Office 3,026,175
Patented Mar. 20, 1962

3,026,175
METHOD FOR THE PREPARATION OF TELLURIDES AND SELENIDES
Stanley M. Kulifay, Dayton, Ohio, assignor to Monsanto Chemical Company, St. Louis, Mo., a corporation of Delaware
No Drawing. Filed Sept. 22, 1958, Ser. No. 762,278
14 Claims. (Cl. 23—50)

The present invention relates to a new method for the preparation of inorganic metal compounds, such as binary and higher tellurides, selenides, antimonides, and arsenides, and particularly mercury selenide, mercury telluride, silver selenide, and silver telluride. It is an object of the invention to prepare a semiconductor type of a crystalline form of the said metal compounds. It is a further object of the invention to prepare the said metal compounds by a low-temperature precipitation method employing acid solutions of sulfur dioxide and acidified solutions of ammonium and metal sulfites and acid sulfites as well as metabisulfites, polythionic compounds and thiosulfates, such as sodium thiosulfate as a precipitating agent and using simple apparatus. Various sulfite reducing agents may be used, including sulfurous acid, and sulfites, bisulfites and acid sulfites of ammonium, sodium, potassium, calcium, and magnesium in the present invention. The preferred members of the group of sulfite reducing agents are solutions of sulfur dioxide or ammonium sulfite acidified with acetic acid. The essential component in the present reduction method using sulfite reducing agents is sulfur dioxide which is supplied by all of the above sources. The degree of acidity utilized is the pH range of from 0 to 6.9.

It is also an object of the invention to prepare metal binary, ternary and higher compounds, such as tellurides, selenides, antimonides, and arsenides having a precisely-controlled stoichiometric or non-stoichiometric composition. In general, the present method makes it possible to prepare various mixed compounds, that is, "doped" ternary and higher compounds, as distinguished from straight binary compounds. It is also an object of the invention to prepare uniformly "doped" metal tellurides, selenides, antimonides and arsenides by precipitating such modified compounds by means of acidified sulfite solutions and their derivatives and analogues, which liberate sulfur dioxide upon acidification.

It is a further object of the invention to prepare in good yield various binaries, such as tellurides, selenides, antimonides, and arsenides and other compounds of metals selected from the group consisting of mercury, platinum, palladium, antimony, bismuth, ruthenium, rhodium, osmium, iridium, copper, silver, gold tellurium and selenium by precipitation from soluble compounds by means of acidified solutions of ammonium sulfite or the various reducing agents set forth above. The compounds which are made by the present method include such compounds as silver mercuride.

The prior art methods which have been available for the preparation of semiconductor-type compounds have suffered a disadvantage in that it has been difficult to achieve precise or predictable stoichiometric proportions which are necessary in order to obtain controlled semiconductive properties. For example, the conventional method of preparing mercury telluride has been a relatively high-temperature, long-time (up to 80 hours) fusion of the respective elements. Another method for the preparation of mercury telluride has been by the reaction of solutions of mercury salts with the highly toxic exceedingly unstable hydrogen telluride in complicated apparatus. Both of these prior art methods have yielded non-stoichiometric mixtures which, being inherently unbalanced, were unpredictable for use as a semiconductor material.

Another difficulty encountered in the methods of the prior art has been the quantitative control of "doping" additives. Such additive materials are employed in minor proportions, which have been difficult to introduce in the precise amounts required to obtain the desired semiconductive properties.

The present method also eliminates the difficult purification of metal tellurides, selenides, antimonides and arsenides which involves distilling off the unreacted components at high temperatures from the crude compounds obtained by conventional methods. One of the difficulties which has attended distillation purification is the partial decomposition of the product, with a consequent loss of the desired stoichiometric proportion.

Another advantage of the present method is that it avoids the necessity of first isolating solids such as selenites and tellurites for subsequent reduction—the selenide or telluride is produced directly from solutions of the metals and/or metalloids.

In one embodiment of the present invention the process begins with the production of a solution of the desired purity containing the dissolved compounds of the specific metal or metals and of tellurium, selenium, antimony, or arsenic. The components may also be introduced as the respective elements or compounds which are dissolved or vaporized for further reaction. However, the invention may be carried out in any desired medium, preferably selected from the group consisting of solutions, melts and vapors. The media contemplated in the present invention embrace solutions of the metal ions, including tellurium, selenium, antimony and arsenic as well as liquid media, such as melts exemplified by molten chloride, such as selenium chloride and bismuth chloride. Vapor phase media are also included, for example, mercuric chloride and tellurimum chloride with or without a carrier gas. Liquid phase media employed in the present invention include not only aqueous systems, but also non-aqueous liquids, such as alcohols, e.g. ethanol.

The concentration employed when solutions are used will be dictated in large part by the solubility of the respective compounds, for example, chlorides or nitrates of mercury, antimony, bismuth, platinum, palladium, ruthenium, rhodium, osmium, iridium, copper silver gold tellurium, selenium, and combinations thereof. In general, the concentration of the soluble metal salt and of the soluble tellurium, selenium, antimony, or arsenic compound may range up to the solubility limits of the respective compounds. For example, in preparing mercury selenide the mercuric nitrate was employed as a 20% solution, while the selenous acid was used in 10% to 15% by weight solution. The source materials of the said tellurides, selenides, antimonides and arsenides are preferably the acid solutions of the element or oxide or any pure, soluble compound. In general, the proportion of the sulfite reducing agent which is employed is 0.1 to 30.0 g. molecular weight (mole) of the said sulfite reducing agent per gram atomic weight of the said tellurium, selenium, antimony, or arsenic. A preferred range is from 1.0 to 15 gram molecular weights. When the reducing agents are mentioned herein, such expressions include not only the reducing agents, per se, but also their commercial solutions and derivatives.

The solution as described above may be heated in order to increase the solubility of the respective compounds therein. This pressure under which the process is conducted is usually atmospheric, but is not critical, and moderate pressure may be employed. The time required for the reaction is also a non-critical factor, although reaction appears to be complete after the first few minutes.

The precipitation of the desired metal tellurides, selenides, arsenides and antimonides is preferably carried out by adding a combined solution or individual solutions of the said starting materials to a solution of aqueous ammonium sulfite, or other sulfite reducing agent, acidified with an acid to a pH of from 0–6.9. The reference to the pH range herein is in accordance with conventional chemical terminology, recognizing that a pH value of 0 is approached asymptotically as an approximate value. However, the three solutions of the anion, the cation and the sulfite reductant may also be mixed simultaneously, or by first adding the reductant to one of the reactants, or to the combined mixture. The strength of such solutions is not critical, although it is necessary to operate with an excess of the solution containing the reductant sulfur dioxide. The present invention may employ either a liquid medium for the precipitation as described above, or a spray-type of precipitation employing liquid sprays of some of the starting materials, such as the metal salts and/or the reducing agent.

The above discussion has been concerned chiefly with the preparation of stoichiometric compounds. However, non-stoichiometric compositions may readily be made by the present method by employing an excess of either the anion or the cation. For example, an excess of 1% by weight of silver introduced in the preparation of silver selenide results in the production of a uniform product having 1% silver as free metal in excess of the theoretical $Ag_2Se$. The working solutions described above may also contain therein any desired soluble doping compound capable of reduction to the element by the reducing agent, such as copper, silver, gold or the platinum metals.

The by-products of the reaction are both water-soluble and volatile and accordingly can be removed from the products by simple filtration and washing and also by subsequent heat treatment for purposes of zone refining.

The temperature employed in carrying out the invention may be from 20° C. to 100° C. in aqueous systems or 20° C. to 200° C. in vapor systems in order to obtain a reduction to the desired metal selenide, telluride, antimonide, or arsenide.

Another embodiment of the present invention based upon the precipitation of binary, and mixed compounds, such as ternary and higher compounds by sulfite reducing agents is the employment of a complexing agent in the precipitation. Preferred complexing agents in the present invention include the group of tartaric acid, citric acid and malic acid. It has been found that the use of the said complexing agents makes it possible to carry out the precitation without incurring the precipitation of metal hydroxides or other contaminating basic compounds. The proportion of the complexing agents, such as tartaric acid, may be varied widely, such as over the range of from 0.1% to 20% by weight relative to the weight of the total solution present.

The following examples illustrate specific embodiments of the present invention.

*Example 1*

The preparation of mercury selenide was carried out by first weighing out 2.1396 g. of mercury which was dissolved by warming with 10 ml. of 1:1 nitric acid. The selenium was provided as 0.8420 g. of the powdered element, in equivalent stoichiometric proportion with the mercury. The selenium was dissolved in a separate beaker with the aid of 9 ml. of 2:1 nitric acid in water, then combined quantitatively with the mercury solution.

A solution containing the ammonium sulfite precipitating agent was prepared from 40 g. of ammonium sulfite monohydrate dissolved in 300 ml. water. The sulfite was completely dissolved at room temperature, after which it was heated to boiling, then acidified with 40 ml. acetic acid, resulting in the liberation in solution of sulfur dioxide. The combined solution of selenium and mercury compounds was then slowly added thereto with constant stirring. An instantaneous black precipitate of mercury selenide formed which soon became a dense, black powder. After boiling for 90 minutes, the product was obtained by filtering the solution and washing the precipitate with water, followed by methanol. The product was dried at 95° C. and obtained in quantitative yield. It was analyzed by X-ray diffraction analysis and was found to be face-centered cubic in structure and to have the stoichiometric proportion of the compound HgSe. The lattice constant for the compound was 6.077 Angstroms. No other crystalline material, such as uncombined Se could be detected.

*Example 2*

The preparation of beta-silver selenide, $Ag_2Se$, was carried out by first preparing separate solutions of 3.3978 g. of silver nitrate in 15 ml. water, plus 10 ml. nitric acid, and 0.7896 g. of powdered selenium in 9 ml. of 2:1 nitric acid. The combined solutions were added to a boiling solution consisting of 40 g. ammonium sulfite monohydrate and 300 ml. water plus 40 ml. acetic acid. This was then boiled and handled in accordance with the method of Example 1. The product was obtained in quantitative yield as a dark gray microcrystalline powder whose D value for lattic constant by X-ray diffraction examination agreed with those in the literature (ASTM) for beta-silver selenide (naumannite). No free silver or solenium could be detected. When Example 2 was repeated using 300 ml. of 6% aqueous sulfur dioxide (acidified with 40 ml. acetic acid), instead of acidified ammonium sulfite as a reducing agent, the same result was obtained.

*Example 3*

The preparation of mercury telluride, HgTe, was conducted by first dissolving 1.9761 g. of mercury in 10 ml. 1:1 nitric acid in water and 1.2570 g. of powdered tellurium in 16 ml. 1:1 aqua regia in water. The combined solutions were then added to a boiling solution of 40 g. of amonium sulfite monohydrate and 300 ml. of water acidified with 40 ml. acetic acid. This was then handled in accordance with the method of Example 1. The product was obtained in quantitative yield as a black powder which, when examined by X-ray diffraction means, revealed it to be face-centered cubic mercury telluride with lattic constant $a=6.44$. No free tellurium could be detected.

*Example 4*

The preparation of silver telluride, $Ag_2Te$, was conducted by first dissolving 3.3978 g. of silver nitrate in 15 ml. water plus 10 ml. nitric acid, and 1.2761 g. of powdered tellurium in 14 ml. 1:1 nitric acid in water. The combined solutions were then added to a boiling solution of 40 g. of ammonium sulfite monohydrate in 300 ml. water plus 40 ml. acetic acid. The acetic acid, as before, was added to the boiling sulfite solution just prior to the addition of the silver-tellurium solution. This was then handled in accordance with the method of Example 1. The product was obtained in quantitative yield as a black powder which, when examined by X-ray diffraction means, revealed it to be crystalline silver telluride, $Ag_2Te$, (hessite). No other crystalline material, such as free silver or tellurium could be detected.

What is claimed is:

1. Method for the preparation of a compound selected from the class consisting of mercury, platinum, palladium, bismuth, ruthenium, rhodium, osmium, iridium, copper, silver and gold selendides and tellurides, which comprises precipitating the desired compound from a medium containing the respective members by admixture with a sulfite reducing agent having a pH of from 0–6.9, in the proportion of from 0.1 to 30.0 molecular weight per atomic weight of tellurium and selenium, and isolating the desired compound from the mixture.

2. Method for the preparation of a compound selected from the class consisting of mercury, platinum, palladium, bismuth, ruthenium, rhodium, osmium, iridium, copper, silver and gold tellurides and selenides, which comprises precipitating the desired compound from media containing the respective members thereof by admixture with a precipitating agent consisting of sulfur dioxide in a liquid medium, in the proportion of from 0.1 to 30.0 molecular weight per atomic weight of tellurium and selenium, and isolating the desired compound from the mixture.

3. Method for the preparation of a compound selected from the class consisting of mercury, platinum, palladium, bismuth, ruthenium, rhodium, osmium, iridium, copper, silver and gold tellurides and selenides, which comprises precipitating the desired compound from solutions containing the respective ions thereof by admixture with a solution of ammonium sulfite and acetic acid, in the proportion of from 0.1 to 30.0 molecular weight per atomic weight of tellurium and selenium, and isolating the desired compound from the mixture.

4. Method for the preparation of a compound selected from the class consisting of mercury, platinum, palladium, bismuth, ruthenium, rhodium, osmium, iridium, copper, silver and gold tellurides and selenides, which comprises precipitating the desired compound from solutions containing the respective ions thereof by admixture with a solution of ammonium sulfite and acetic acid having a pH of from 0–6.9, in the proportion of from 0.1 to 30.0 molecular weight per atomic weight of tellurium and selenium, and isolating the desired compound from the mixture.

5. Method for the preparation of a compound selected from the class consisting of mercury, platinum, palladium, bismuth, ruthenium, rhodium, osmium, iridium, copper, silver and gold tellurides and selenides, which comprises precipitating the desired compound from media containing the respective members thereof by admixture with a precipitating agent consisting of a mixture of a sulfite salt and acetic acid having a pH of from 0–6.9, in the proportion of from 0.1 to 30.0 molecular weight per atomic weight of tellurium and selenium, and isolating the desired compound from the mixture.

6. Method for the preparation of a compound selected from the class consisting of mercury, platinum, palladium, bismuth, ruthenium, rhodium, osmium, iridium, copper, silver and gold tellurides and selenides, which comprises precipitating the desired compound from solutions containing the respective ions thereof by admixture with a solution of sulfurous acid, in the proportion of from 0.1 to 30.0 molecular weight per atomic weight of tellurium and selenium, and isolating the desired compound from the mixture.

7. Method for the preparation of mercury selenide which comprises precipitating dissolved mercury and selenium ions by admixture with a mixture of aqueous ammonium sulfite and acetic acid, in the proportion of from 0.1 to 30.0 molecular weight per atomic weight of selenium, and isolating the desired compound from the mixture.

8. Method for the preparation of mercury telluride which comprises precipitating dissolved mercury and tellurium ions by admixture with a mixture of aqueous ammonium sulfite and acetic acid, in the proportion of from 0.1 to 30.0 molecular weight per atomic weight of tellurium, and isolating the desired compound from the mixture.

9. Method for the preparation of silver selenide, which comprises precipitating dissolved silver and selinium ions by admixture with a mixture of aqueous ammonium sulfite and acetic acid, in the proportion of from 0.1 to 30.0 molecular weight per atomic weight of selenium, and isolating the desired compound from the mixture.

10. Method for the preparation of silver telluride, which comprises precipitating dissolved silver and tellurium ions by admixture with a mixture of aqueous ammonium sulfite and acetic acid, in the proportion of from 0.1 to 30.0 molecular weight per atomic weight of tellurium, and isolating the desired compound from the mixture.

11. Method for the preparation of palladium telluride, which comprises precipitating dissolved palladium and tellurium ions by admixture with a mixture of aqueous ammonium sulfite and acetic acid, in the proportion of from 0.1 to 30.0 molecular weight of tellurium, and isolating the desired compound from the mixture.

12. Method for the preparation of ruthenium selenide, which comprises precipitating dissolved ruthenium and selenium ions by admixture with a mixture of aqueous ammonium sulfite and acetic acid, in the proportion of from 0.1 to 30.0 molecular weight per atomic weight of selenium, and isolating the desired compound from the mixture.

13. Method for the preparation of platinum telluride, which comprises precipitating dissolved platinum and tellurium ions by admixture with a mixture of aqueous ammonium sulfite and acetic acid, in the proportion of from 0.1 to 30.0 molecular weight per atomic weight of tellurium, and isolating the desired compound from the mixture.

14. Method for the preparation of compounds selected from the class consisting of mercury, platinum, palladium, bismuth, selenium, tellurium, ruthenium, rhodium, osmium, iridium, copper, silver and gold tellurides and selenides which comprises precipitating the said composition by admixture of a solution containing the desired ions with a solution of a sulfite-reducing agent in the proportion of from 0.1 to 30.0 molecular weights of the said sulfite-reducing agent per atomic weight of the said tellurium and selenium, the said precipitation being conducted in the presence of a compound selected from the group consisting of tartaric acid, citric acid and malic acid, the proportion of the said compound being from 0.1% to 20% by weight relative to the weight of the total solutions present, and isolating the desired metal compound from the mixture.

References Cited in the file of this patent

UNITED STATES PATENTS

| 2,534,562 | Thomsen | Dec. 19, 1950 |
| 2,860,954 | Bueker et al. | Nov. 18, 1958 |

FOREIGN PATENTS

| 142,728 | Australia | Aug. 6, 1951 |
| 800,868 | Great Britain | Sept. 3, 1958 |

OTHER REFERENCES

Thorpe: "Dictionary of Applied Chemistry," Longmans, Green and Co., N.Y., 1916, vol. V, page 434.

Mellor: "Comprehensive Treatise on Inorganic and Theoretical Chemistry," Longmans, Green and Co., N.Y., vol. 11, p. 33 (1931); vol. 10, 1930, pages 771, 774, 778 and 802; vol. 11, 1931, pages 44, 45, 52 and 64.

Hampel: "Rare Metal Handbook," Reinhold Publishing Corp., N.Y., 1954, pages 369, 375, 407 to 413.